United States Patent [19]

Hampton

[11] 4,187,533
[45] Feb. 5, 1980

[54] SUBMERSIBLE FISHING LAMP ASSEMBLY

[76] Inventor: William C. Hampton, 4007 Fern Valley Rd., Louisville, Ky. 40219

[21] Appl. No.: 875,138

[22] Filed: Feb. 6, 1978

[51] Int. Cl.² .............. A01K 97/00; A01K 85/01; F21L 5/00; F21L 15/02; F21V 1/22; F21V 1/24; F21V 17/06

[52] U.S. Cl. .................. 362/257; 43/17.5; 362/158; 362/186; 362/351; 362/353; 362/362; 362/435; 362/436; 362/439; 362/458

[58] Field of Search .............. 43/17.5, 17.6, 41; 362/158, 186, 154, 458, 362, 404, 166, 351, 353, 435, 436, 433, 437, 439, 257, 812

[56] References Cited

U.S. PATENT DOCUMENTS

| 861,689 | 7/1907 | Wilhems | 362/812 |
|---|---|---|---|
| 1,768,255 | 6/1930 | Jaffe | 362/438 |
| 1,847,775 | 3/1932 | Manfre | 362/812 |
| 1,922,517 | 8/1933 | Amory | 362/812 |
| 2,354,242 | 7/1944 | Beals | 362/436 |
| 2,908,993 | 10/1959 | Webb et al. | 43/17.5 |
| 3,070,690 | 12/1962 | Horn | 362/436 |
| 3,079,721 | 3/1963 | Smith | 43/17.5 |
| 3,177,604 | 4/1965 | Ewing | 43/17.5 |
| 3,267,277 | 8/1966 | McLamb | 43/17.5 |
| 3,510,978 | 5/1970 | Murdock | 43/17.5 |
| 4,020,580 | 5/1977 | Chappell et al. | 43/17.5 |

FOREIGN PATENT DOCUMENTS

| 493015 | 2/1930 | Fed. Rep. of Germany | 362/351 |
|---|---|---|---|
| 941140 | 4/1956 | Fed. Rep. of Germany | 362/351 |
| 54816 | 6/1937 | Norway | 43/17.5 |
| 466615 | 6/1937 | United Kingdom | 362/351 |
| 516983 | 1/1940 | United Kingdom | 362/351 |
| 721456 | 1/1955 | United Kingdom | 362/437 |

Primary Examiner—Benjamin R. Padgett
Assistant Examiner—T. S. Gron
Attorney, Agent, or Firm—Maurice L. Miller, Jr.

[57] ABSTRACT

A fisherman's appliance to aid in attracting fish to a baited fish hook or artificial lure having a pair of spaced non-transparent circular plates between which is disposed an electric lamp bulb for directly illuminating surrounding water in which the appliance is suspended radially and horizontally outwardly from the appliance and in a relatively narrow vertical beam above and below the level of the appliance in the water.

4 Claims, 3 Drawing Figures

U.S. Patent
Feb. 5, 1980
4,187,533
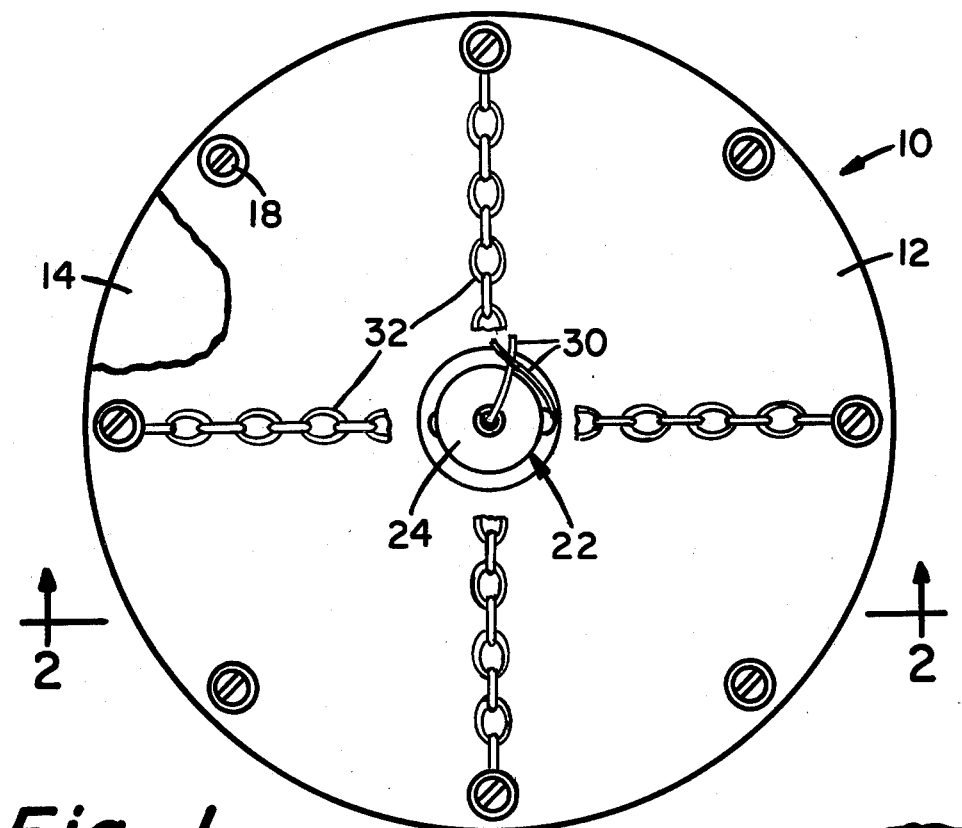
Fig. 1
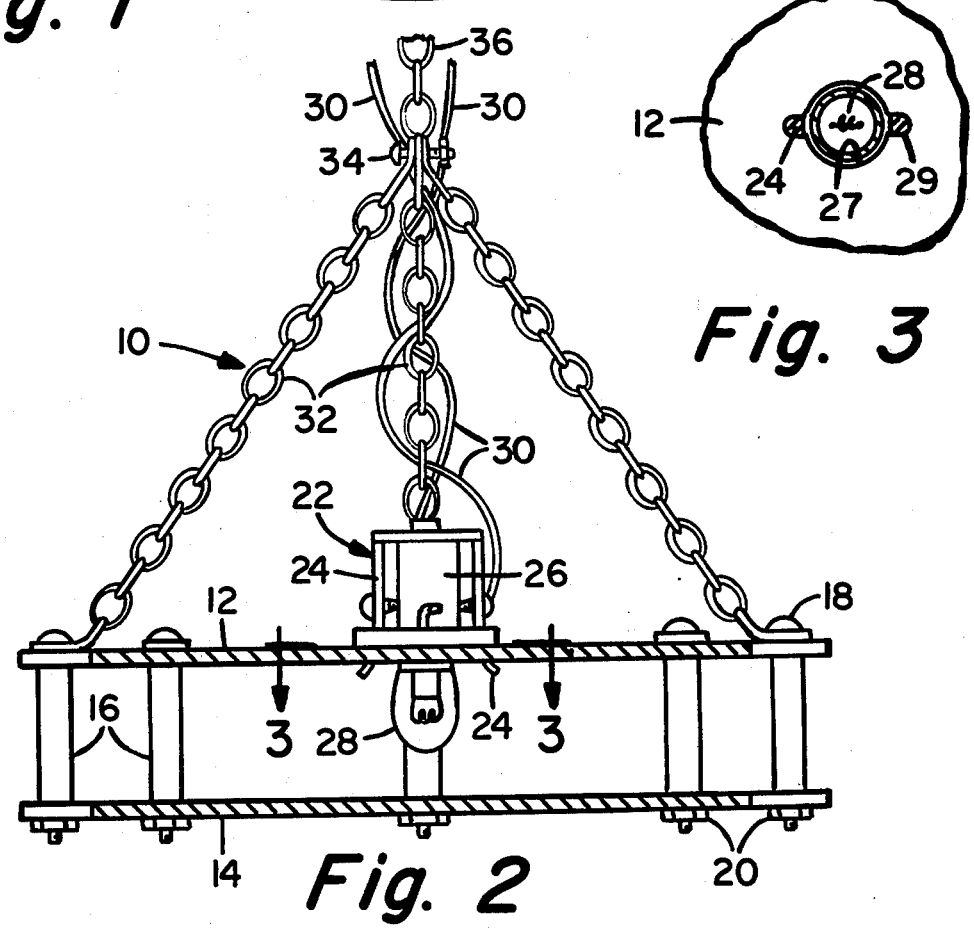
Fig. 3
Fig. 2

SUBMERSIBLE FISHING LAMP ASSEMBLY

BACKGROUND OF THE INVENTION

This invention relates to a new and useful improvement in a fisherman's appliance and more particularly to a submersible lamp assembly for attracting fish to a baited hook or artificial lure.

Submersible fishing lamp assemblies, generally speaking, have been known in the prior art. See, for example, U.S. Pat. No. 3,079,721 issued to N. J. Smith on Mar. 5, 1963, U.S. Pat. No. 3,177,604 issued to A. L. Ewing on Apr. 13, 1965 and U.S. Pat. No. 3,267,277 issued to M. R. McLamb on Aug. 16, 1966. The patent to Smith discloses a water tight electric lamp removably secured immediately above a transparent canister so that high intensity light is projected downwardly through the canister to illuminate live bait swimming in confinement therein. As a consequence, the Smith assembly projects light downwardly into the water surrounding the canister in a widely dispersed inverted cone shaped pattern.

The reference patent to Ewing discloses an electric lamp disposed within a transparent jar also containing live bait swimming in confinement therein. Light dispersion into the surrounding water will be highly omni-directional except perhaps for a cone of relatively darker water extending upward and outward from its vertex immediately on top of the jar lid.

Lastly, the patent to McLamb discloses a gas lantern confined within a watertight transparent bowl. The reference assembly may be lowered into the water to a depth which will permit feeding of gas to the submerged lamp through a gas line from above the water surface and which will permit the assembly to be vented to the air above the water through an extended vent tube. The depth to which the McLamb assembly may be lowered is therefore severely limited by the length of the gas feed and exhaust vent lines.

A difficulty that has been encountered with such prior art lamps results from the wide disbursion of light into the water surrounding the lamp particularly at levels well above and below the level of the light source. I have found that better results can be obtained by suspending a fishing hook, either containing live bait or an artificial lure, in an area of relative darkness below the level of the light source and outside of the region of direct illumination. It is extremely difficult to position the fishing hook at such a location using these prior art devices since the dispersion of light from the light source is so general and relatively omnidirectional. Further, in order to fish far enough from such a prior art light source such that the fish hook can be considered to be in relative darkness below the level thereof, the hook must be located so far away as to be for all practical purposes unassociated with the lamp. Fish attracted toward the ill-defined perimeter of such a generalized light source usually are too far from the hook to be attracted to the bait or lure thereof.

My invention substantially overcomes this and other prior art difficulties.

SUMMARY OF THE INVENTION

It is an object of my invention to provide a submersible fishing lamp assembly adapted to directly illuminate surrounding water radially and horizontally outward from said assembly in a relatively narrow layer.

Briefly, in accordance with my invention, I provide a submersible fishing lamp assembly having a pair of spaced non-transparent generally circular plates. Also included is means for securing the plates parallel to and in registry with one another such that the diameter of the plates is substantially greater than the space between them. Lastly, I provide illuminating means disposed between the plates for illuminating water into which the assembly is immersed.

These and other objects of my invention will become apparent to those skilled in the art from the following detailed description and attached drawings upon which, by way of example, only a preferred embodiment of my invention is illustrated.

BRIEF DESCRIPTION OF THE DRAWINGS

FIG. 1 shows a top plan view of the submersible fishing lamp assembly of my invention illustrating one preferred embodiment thereof.

FIG. 2 shows a cross-sectioned elevation view of the assembly of FIG. 1 as viewed along lines 2—2 of the latter figure.

FIG. 3 is a fragmented plan view of a central portion of the assembly of FIGS. 1 and 2 with light fixture removed.

DESCRIPTION OF THE PREFERRED EMBODIMENT

Referring now to the figures there is shown, in one preferred embodiment of my invention, a submersible fishing lamp assembly 10 having a pair of non-transparent or light opaque circular or disc shaped plates 12 and 14, the broad surfaces of which are parallel and spaced apart by means of spacers 16. Suitable threaded fasteners such as bolts 18 project through the plates 12, 14 and spacers 16 and are secured in the latter by means of nuts 20. The assembly 10 must of course be non-floatable in water whereby it is preferrable to form the plates 12, 14 from a sinkable material such as aluminum, plastic or other suitable material.

A suitable light fixture 22 having springable fingers 24 and a bulb socket 26 is fixedly attached to a central portion of the top plate 12 so that an electric light bulb 28 extends downward from the socket 26 through a hole 27 in the top plate 12 into the space between the plates 12, 14. The fingers 24 lie within slots 29 formed on opposite sides of the hole 27 and press outwardly against the material of the plate 12 (See FIG. 3). To change the bulb 28 it is then merely necessary to force the fingers 24 inwardly toward the center of the hole 27 with the hand and lift the entire fixture 22 off the plate 12. Accordingly, I recommend using a 12 volt d.c. lamp bulb and socket such as the snap-in type commonly found in automobile tail lights of the present day. Electrical lead wires 30 connected to the frame 24 and socket 26 in the usual manner may be twisted together and extended upward from the fixture 22 through the water to a 12 volt battery located in a fishing boat or on a pier above. Since 12 volt troll motors and 12 volt electric starters are often found as standard equipment in present day fishing boats, such boats provide a handy power source for the assembly 10 when equiped with a 12 volt light source such as the socket 26 and bulb 28.

The assembly 10 may be lowered into the water by means of any suitable suspension system such as string, ropes, wire, chains or other suitable means. In the present example, I illustrate the use of four chains 32 hooked under four of the bolts 18 on the top plate 12 at ninety degree spacing around the perimeter thereof. The chains 32 are collected together at a vertex point above the light fixture 22 and are secured together with a nut and bolt 34 projecting through a link in each of the chains 32. A suspension chain 36, also connected to the nut and bolt 34, is used to raise and lower the assembly 10 in the water. The twisted pair of electrical lead wires 30 may be conveniently strung along the chain 36 to the battery source above the water so that the chain 34 takes most of the weight of the assembly 10.

It is important that the diameter of the plates 12, 14 be relatively greater than the spacing between them such that the light emitted by the bulb 28 radially into the surrounding water will be largely confined to a relatively thin layer about the level of the assembly 10. While some dispersion of light above and below the assembly 10 is to be expected in water, such dispersion can be minimized by constructing the assembly 10 such that the ratio of the diameter of the plates 12, 14 to the spacing between them is at least 4:1 and preferably 5:1 or more. While this ratio is not critical, the greater it is, the closer will be the width of the layer of water being directly illuminated by the bulb 28 to the spacing between the plates 12,14, neglecting indirect illumination of the water above and below the layer resulting from refraction.

As previously mentioned, I have found that best results are obtained with the lamp assembly of my invention, when a baited fishing hook or artificial lure is suspended into the water about 8 or 10 feet below the assembly 10 just outside of the well defined zone of illumination and into the edge of the dark region of water. It should also noted that since a 12 volt bulb is recommended for use in the assembly of the subject example which is directly immersed in water, the assembly 10 should be lowered into the water before the lead wires 30 are connected across the power source to illuminate the bulb 28. Should the bulb be energized prior to lowering of the assembly 10 into the water such that it reaches an elevated operating temperature higher than that for which it would normally operate in the water, its sudden introduction therein can be expected to shatter the bulb 28.

Although the subject invention has been described with respect to specific details of a preferred embodiment thereof, it is not intended that such details limit the scope and coverage of the subject invention except to the extent set forth in the following claims.

I claim:

1. A submersible fishing lamp assembly adapted to directly illuminate surrounding water radially and horizontally outward from said assembly in a relatively narrow layer consisting essentially of a pair of spaced opaque generally circular plates, one such plate having a hole through the center thereof through which an illuminating means can project:

means securing said plates parallel to and in registry with one another such that the diameter of said plates is at least four times greater than the distance between them, said securing means including fasteners projecting through said plates and plate spacers;

illuminating means disposed between said plates for illuminating water into which said assembly is immersed, said illuminating means comprising a standard light bulb projecting through said hole in said one plate and a light bulb socket; and suspending means connected approximately equidistant around the periphery of said one plate and secured together at a vertex point above said one plate.

2. The assembly of claim 1 wherein said illuminating means comprises
a standard light bulb,
a light bulb socket, and
a frame having a pair of springable fingers attached to said socket, one of said plates defining a circular hole through the center thereof through which a light bulb disposed in said socket can project into the space between said plates, said one plate also defining a pair of slots communicating with said hole into which said fingers project to removably secure said frame and socket to said one plate.

3. The assembly of claim 1 wherein said plates are constructed of aluminum or plastic.

4. The assembly of claim 1 wherein said suspending means comprises four chains, one end of each of which is connected to an edge portion of the same one of said plates, said chains being connected approximately equidistant around the periphery of said one plate, the other ends of said chains being collected and secured together at a vertex point above said one plate.

* * * * *